United States Patent
Terashima

(10) Patent No.: US 11,097,737 B2
(45) Date of Patent: Aug. 24, 2021

(54) CONTROL APPARATUS FOR VEHICLE

(71) Applicant: TOYOTA JIDOSHA KABUSHIKI KAISHA, Toyota (JP)

(72) Inventor: Masato Terashima, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/830,541

(22) Filed: Mar. 26, 2020

(65) Prior Publication Data

US 2020/0339120 A1 Oct. 29, 2020

(30) Foreign Application Priority Data

Apr. 26, 2019 (JP) ............................. JP2019-086753

(51) Int. Cl.
*B60W 30/188* (2012.01)
*B60K 17/16* (2006.01)
*B60W 10/06* (2006.01)
*B60W 10/10* (2012.01)
*B60W 10/196* (2012.01)
(Continued)

(52) U.S. Cl.
CPC .......... *B60W 30/188* (2013.01); *B60K 17/16* (2013.01); *B60W 10/06* (2013.01); *B60W 10/10* (2013.01); *B60W 10/196* (2013.01); *F02D 9/08* (2013.01); *F02D 13/04* (2013.01); *F16H 59/36* (2013.01); *F16H 61/0213* (2013.01); *B60W 10/08* (2013.01); *B60W 10/105* (2013.01); *B60W 20/17* (2016.01); *B60W 30/18136* (2013.01); *F02D 2200/101* (2013.01); *F16H 2059/366* (2013.01)

(58) Field of Classification Search
CPC .. Y10T 477/69; Y10T 477/23; B60W 30/188; B60W 10/06; B60W 10/10; B60W 20/17; B60W 30/18136; B60W 10/08; B60W 2510/0638; B60W 2710/0605; B60W 20/30; B60W 20/10; B60W 2710/0644; B60W 2710/0666; B60W 10/105; F02D 13/04; F02D 2200/1001; F16H 596/36; F16H 2059/366
See application file for complete search history.

(56) References Cited

U.S. PATENT DOCUMENTS 9,855,951 B1 * 1/2018 Lister .................... B60W 10/06
10,836,391 B1 * 11/2020 Belt ................ B60W 30/18136
(Continued)

FOREIGN PATENT DOCUMENTS

JP 2012-207772 A 10/2012

*Primary Examiner* — Roger L Pang
(74) *Attorney, Agent, or Firm* — Oblon, McClelland, Maier & Neustadt, L.L.P.

(57) ABSTRACT

A vehicle control apparatus calculates a target speed value of an engine rotational speed that is required to provide a required torque value of an engine brake torque, and controls shifting of an automatic transmission such that the engine rotational speed is approximated to the target speed value of the engine rotational speed. The vehicle control apparatus determines whether the target speed value exceeds a predetermined threshold value. When the target speed value exceeds the predetermined threshold value, the vehicle control apparatus controls the shifting of the automatic transmission such that the engine rotational speed is held not higher than the predetermined threshold value, and controls a throttle valve such that the throttle valve is opened.

8 Claims, 4 Drawing Sheets

(51) Int. Cl.
*F02D 9/08* (2006.01)
*F02D 13/04* (2006.01)
*F16H 59/36* (2006.01)
*F16H 61/02* (2006.01)
*B60W 20/17* (2016.01)
*B60W 10/08* (2006.01)
*B60W 10/105* (2012.01)
*B60W 30/18* (2012.01)

(56) References Cited

U.S. PATENT DOCUMENTS

2018/0215372 A1* 8/2018 Hosokawa ...... B60W 30/18127
2018/0304895 A1 10/2018 Okubo et al.

* cited by examiner

CONTROL APPARATUS FOR VEHICLE

This application claims priority from Japanese Patent Application No. 2019-086753 filed on Apr. 26, 2019, the disclosure of which is herein incorporated by reference in its entirety.

FIELD OF THE INVENTION

The present invention relates in general to a control apparatus for a vehicle, and, more particularly, to an engine brake control that is to be executed to provide a required torque value of an engine brake torque, by controlling shifting of an automatic transmission so as to approximate an engine rotational speed to its target speed value.

BACKGROUND OF THE INVENTION

There is known a control apparatus that is to be provided in a vehicle including (i) an engine that is used as a drive force source for driving the vehicle, and (ii) an automatic transmission that constitutes a part of a drive-force transmitting path between the engine and drive wheels, wherein the control apparatus includes an engine-brake control portion configured to calculate a target speed value of a rotational speed of the engine that is required to provide a required torque value of an engine brake torque, and wherein the engine-brake control portion is configured to control shifting of the automatic transmission such that the rotational speed of the engine is approximated to the target speed value of the rotational speed of the engine. JP-2012-207772A discloses an example of such a control apparatus. In the Japanese Patent Application Publication, there is described a technique for calculating a target speed value of the engine rotational speed that is required to provide a target deceleration value of the vehicle, and controlling a gear ratio of a belt-type continuously-variable transmission as the automatic transmission such that the engine rotational speed becomes equal to the calculated target speed value.

SUMMARY OF THE INVENTION

By the way, when the engine rotational speed becomes high, fluctuation of the engine rotational speed is increased whereby rattle noises could be generated due to, for example, backlash of gears and plays of thrust bearings of the drive-force transmitting path. Where the engine is a reciprocating engine, i.e., a piston engine, in which each piston is to be reciprocated, the fluctuation of the engine rotational speed is increased with increase of a reciprocating inertia torque of the piston that is caused with increase of the engine rotational speed. In the control apparatus disclosed in the above-identified JP-2012-207772A, when the target value of the engine rotational speed exceeds NVH threshold value R3, the shifting of the automatic transmission is limited such that the engine rotational speed becomes equal to the NVH threshold value R3. However, the limitation on the shifting of the automatic transmission leads to a shortage of the engine brake torque thereby resulting in reduction of a deceleration performance of the vehicle and possible reduction of a drivability of the vehicle.

The present invention was made in view of the background art described above. It is therefore an object of the present invention to provide a control apparatus capable of providing a vehicle with a satisfactory deceleration performance by an engine brake while restraining generation of rattle noises by increase of an engine rotational speed.

The above-described object indicated above is achieved according to the following aspects of the present invention.

According to a first aspect of the invention, there is provided a control apparatus that is to be provided in a vehicle, the vehicle including (i) an engine that is used as a drive force source for driving the vehicle, and (ii) an automatic transmission that constitutes a part of a drive-force transmitting path between the engine and drive wheels of the vehicle, wherein the control apparatus comprises an engine-brake control portion configured to calculate a target speed value of a rotational speed of the engine that is required to provide a required torque value of an engine brake torque, wherein the engine-brake control portion is configured to control shifting of the automatic transmission such that the rotational speed of the engine is approximated to the target speed value of the rotational speed of the engine, wherein the engine-brake control portion is configured to determine whether the target speed value of the rotational speed of the engine exceeds a predetermined threshold value, and wherein, when the target speed value exceeds the predetermined threshold value, the engine-brake control portion is configured to control the shifting of the automatic transmission such that the rotational speed of the engine is held not higher than the predetermined threshold value, and is configured to control a throttle valve of the engine such that the throttle valve is opened. For example, when the target speed value does not exceed the predetermined threshold value, the engine-brake control portion may be configured to control the shifting of the automatic transmission such that the rotational speed of the engine becomes substantially equal to the target speed value, and may be configured to keep the throttle valve closed. Further, the control apparatus may further comprise a transmission-shifting control portion configured to control the shifting of the automatic transmission, wherein, when the target speed value exceeds the predetermined threshold value, the engine-brake control portion may be configured to cause the transmission-shifting control portion to control the shifting of the automatic transmission such that the rotational speed of the engine is held not higher than the predetermined threshold value. Still further, the control apparatus may further comprise an engine control portion configured to control the throttle valve of the engine, wherein, when the target speed value exceeds the predetermined threshold value, the engine-brake control portion may be configured to cause the engine control portion to control the throttle valve of the engine such that the throttle valve is opened.

According to a second aspect of the invention, in the control apparatus according to the first aspect of the invention, the target speed value of the rotational speed of the engine is calculated based on a target deceleration value of the vehicle.

According to a third aspect of the invention, in the control apparatus according to the first or second aspect of the invention, the automatic transmission is an electrically-controlled continuously-variable transmission that includes a differential-control rotating machine and a differential mechanism, wherein the differential mechanism includes a first rotary element connected to the differential-control rotating machine, a second rotary element connected to the engine, and a third rotary element connected to an output member, and wherein the electrically-controlled continuously-variable transmission is configured to continuously change the rotational speed of the engine with a rotational speed of the differential-control rotating machine being controlled.

According to a fourth aspect of the invention, in the control apparatus according to any one of the first through third aspects of the invention, the predetermined threshold value is determined based on rattle noises generated in the drive-force transmitting path due to fluctuation of the rotational speed of the engine, such that generation of the rattle noises is restrained with the rotational speed of the engine being held not higher than the predetermined threshold value.

According to a fifth aspect of the invention, in the control apparatus according to the first through fourth aspect of the invention, the engine has an engine brake characteristic that the engine brake torque is higher when the throttle valve is controlled to be opened than when the throttle valve is fully closed as long as the rotational speed of the engine is not lower than a certain speed value, wherein the predetermined threshold value of the rotational speed of the engine is higher than the certain speed value of the rotational speed of the engine.

In the control apparatus according to any one of the first through fifth aspects of the invention, when the target speed value exceeds the predetermined threshold value, the shifting of the automatic transmission is limited such that the rotational speed of the engine is held not higher than the predetermined threshold value, and the throttle valve of the engine is controlled to be opened. Thus, it is possible to restrain generation of rattle noises that could be caused with the engine rotational speed exceeding the predetermined threshold value, and to provide the vehicle with a satisfactory deceleration performance owing to increase of the engine brake torque that is made with the throttle valve being controlled to be opened. In general, in a high rotational speed range of the engine, when the throttle valve is controlled to be opened to allow an outside gas or air to be intaken into a combustion chamber of each cylinder of the engine, a resistance (i.e., pressure within the combustion chamber) is increased during a compression stroke of the cylinder, thereby increasing a pumping loss. Thus, in general, the engine has a characteristic that, in the high rotational speed range of the engine, the engine brake torque is increased more when the throttle valve is controlled to be opened than when the throttle valve is fully closed (see FIG. 6, for example). With the predetermined threshold value of the engine rotational speed being appropriately determined based on a relationship between the engine rotational speed and the generation of the rattle noises, namely, depending on presence/absence and volume of the rattle noises in each level of the engine rotational speed, it is possible to restrain the generation of the rattle noises, with the engine rotational speed being held not higher than the predetermined threshold value (corresponding to a rattle-noise determination value α shown in FIG. 6), and to provide the vehicle with a satisfactory deceleration performance, with increase of the engine brake torque that is made with the throttle valve being controlled to be opened.

In the control apparatus according to the second aspect of the invention, the target speed value of the rotational speed of the engine is calculated based on the target deceleration value of the vehicle, so that it is possible to cause the vehicle to be decelerated at an appropriate rate dependent on the target deceleration value, while restraining generation of the rattle noises.

The control apparatus according to the third aspect of the invention is to be provided in the vehicle in which the automatic transmission is the electrically-controlled continuously-variable transmission that includes the differential-control rotating machine and the differential mechanism. In such a vehicle, since a torque converter or other fluid-operated drive-force transmitting device is not required, the fluctuation of the engine rotational speed is transmitted directly or through a damper device to the drive-force transmitting path including the electrically-controlled continuously-variable transmission, so that the rattle noises could be easily generated in the drive-force transmitting path. In such a vehicle, a technical advantage of the invention is particularly significant wherein the technical advantage is that a satisfactory deceleration performance is assured with a sufficient increase of the engine brake torque while generation of the rattle noises is restrained, by a control arrangement in which the throttle valve is controlled to be opened while the engine rotational speed is controlled to be held not higher than the predetermined threshold value.

In the control apparatus according to the fourth aspect of the invention, the predetermined threshold value is determined based on the rattle noises generated in the drive-force transmitting path due to the fluctuation of the rotational speed of the engine, such that generation of the rattle noises is restrained with the rotational speed of the engine being held not higher than the predetermined threshold value. Owing to this control arrangement, it is possible to appropriately restrain the generation of the rattle noises that could be caused due to the fluctuation of the engine rotational speed.

In the control apparatus according to the fifth aspect of the invention, the engine has an engine brake characteristic that the engine brake torque is higher when the throttle valve is controlled to be opened than when the throttle valve is fully closed as long as the rotational speed of the engine is not lower than a certain speed value, wherein the predetermined threshold value of the rotational speed of the engine is higher than the certain speed value of the rotational speed of the engine. It is therefore possible to reliably increase the engine brake torque with the throttle valve being controlled to be opened, while restraining the generation of the rattle noises with the engine rotational speed being held not higher than the predetermined threshold value.

DETAILED DESCRIPTION OF PREFERRED EMBODIMENT

Figure 1:
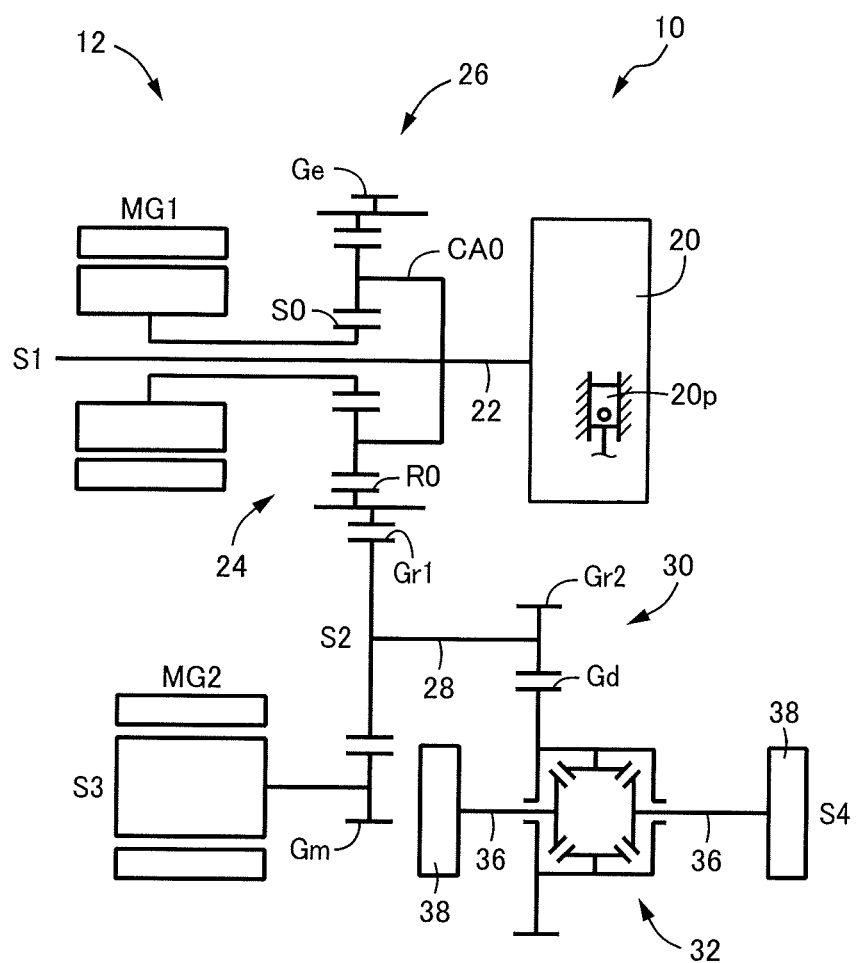
FIG. 1 is a schematic view showing a drive-force transmitting apparatus of a hybrid vehicle to which the present invention is applied, wherein the schematic view is a development view illustrating the drive-force transmitting apparatus in a manner in which a plurality of axes of the drive-force transmitting apparatus are contained in a single plane.

The present invention is applicable advantageously to a vehicle having an electrically-controlled continuously-variable transmission, wherein the vehicle has, in addition to an engine as a drive force source for driving the vehicle, a vehicle-driving rotating machine as another drive force source for driving the vehicle. However, the invention is applicable also to other types of vehicles such as an engine drive vehicle having the engine as only one drive force source for driving the vehicle and a vehicle having a mechanically-operated step-variable or continuously-variable transmission in addition to or in place of the electrically-controlled continuously-variable transmission. Further, a fluid-operated drive-force transmitting device such as a torque converter may be provided in the drive-force transmitting path. It is preferable that the differential-control rotating machine of the electrically-controlled continuously-variable transmission is constituted by a motor generator that can be used as a selected one of an electric motor and a generator. However, the differential-control rotating machine may be constituted by a generator. Further, the differential mechanism of the electrically-controlled continuously-variable transmission is preferably constituted by a planetary gear device of single-pinion type or double-pinion type. Still further, the present invention is advantageously applied to a vehicle in which the engine is an internal combustion engine (such as a gasoline engine or a diesel engine, which is configured to generate the drive force by combustion of a fuel) and is a reciprocating engine including a piston that is to be reciprocated when the engine is driven so that fluctuation of the engine rotational speed is increased with increase of the engine rotational speed.

Where the automatic transmission is a mechanically-operated step-variable transmission, if the target speed value of the engine rotational speed is determined irrespective of gear positions of the step-variable transmission, there is a possibility that the engine rotational speed could not be changed precisely to the target speed value by the shifting of the transmission. However, for example, the shifting may be made to select one of the gear positions that can provide a speed value of the engine rotational speed close to the target speed value of the engine rotational speed. Alternatively, the target speed value of the engine rotational speed may be set to a speed value which can be provided by one of the gear positions, namely, which can be established by the shifting of the mechanism selecting one of the gear positions. In other words, one of the gear positions, which is to be selected, may be determined depending on the required torque value of the engine brake torque, and a speed value of the engine rotational speed that can be provided by the determined and selected one of the gear positions may be regarded as the target speed value of the engine rotational speed, so that required signal processing operations such as comparison of the speed value regarded as the target speed value with the predetermined threshold value.

The engine-brake control portion is configured to calculate the target speed value of the engine rotational speed which is required to provide the required torque value of the engine brake torque. In this instance, the target speed value of the engine rotational speed may be calculated based on the target deceleration value of the vehicle because the engine brake torque corresponds to deceleration of the vehicle. The target deceleration value is determined, for example, based on the running speed upon acceleration OFF when an accelerator pedal is released from depression. However, the target deceleration value may be determined to be increased or reduced depending on a command requesting deceleration of the vehicle, wherein the command is made through an operation of an operator of the vehicle. Further, for example, during an automatic running of the vehicle, the target deceleration value of the vehicle may be set to a required deceleration value which is predetermined to reduce the running speed in the automatic running, and which is read out from an automatic-running control portion or another control portion other than the engine-brake control portion. That is, the determination or setting of the target deceleration value may be made in any one of various manners. Moreover, the required torque value of the engine brake torque may be calculated depending on the required engine brake torque that is based on a command requesting increase or reduction of the engine brake torque, wherein the command is made through an operation of the vehicle operator.

The engine-brake control portion is configured, when the target speed value of the engine rotational speed exceeds the predetermined threshold value, to control the shifting of the automatic transmission such that the engine rotational speed is held not higher than the predetermined threshold value, for restraining generation of the rattle noises, and to control the throttle valve of the engine such that the throttle valve is opened for increasing the engine brake torque. However, the target deceleration value of the vehicle does not have to be necessarily obtained. Further, although the throttle valve may be controlled to be opened to a constant degree such as a fully opened degree (100%), the throttle valve may be controlled also to be opened to an adjusted degree adjusted depending on the target deceleration value of the vehicle. Moreover, under a certain condition, for example, in which the target deceleration value of the vehicle cannot be established by opening the throttle-valve, the shifting of the automatic transmission may be controlled with a less restricted limitation, for example, such that the engine rotational speed is increased to a speed value higher than the predetermined threshold value until the target deceleration value can be established by opening the throttle valve. That is, the limitation on the shifting of the automatic transmission may be alleviated to a degree that makes it possible to establish the target deceleration value with the throttle valve being controlled to be opened.

EMBODIMENT

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

FIG. 1 is a schematic view showing a drive-force transmitting apparatus 12 of a hybrid vehicle 10 to which the present invention is applied, wherein the schematic view is a development view illustrating the drive-force transmitting apparatus 12 in a manner in which a plurality of axes of the drive-force transmitting apparatus 12 are contained in a single plane. The drive-force transmitting apparatus 12 is a hybrid vehicle transaxle of a lateral installation type in which the plurality of axes are arranged to extend in a parallel to a width (lateral) direction of the hybrid vehicle (hereinafter simply referred to as "vehicle") 10, and is to be used advantageously for a vehicle of FF (front drive-force source and front drive) system. The vehicle 10 and the drive-force transmitting apparatus 12 correspond to "vehicle" and "drive-force transmitting path", respectively, which are recited in the appended claims.

The drive-force transmitting apparatus 12 has first through fourth axes S1-S4 that are substantially parallel to the width direction of the vehicle 10. On the first axis S1, there are provided an input shaft 22 connected to an engine 20. A planetary gear device 24 of single pinion type and a first motor generator MG1 are provided to be coaxial with the first axis S1. The engine 20 is an internal combustion engine such as a gasoline engine or a diesel engine, which is configured to generate a drive force by combustion of a fuel. In the present embodiment, the engine 20 is a reciprocating engine including a piston 20p that is to be reciprocated when the engine 20 is driven. The engine 20 is connected to the input shaft 22, for example, through a damper device, without through a fluid-operated drive-force transmitting device such as a torque converter.

The planetary gear device 24 and the first motor generator MG1 cooperates with each other to constitute an electrically-controlled continuously-variable transmission 26. The planetary gear device 24 serving as a differential mechanism includes three rotary elements in the form of a sun gear S0, a carrier CA0 and a ring gear R0, which are rotatable at respective different speeds. The first motor generator MG1 is connected to the sun gear S0. The engine 20 is connected to the carrier CA0 through the input shaft 22. The ring gear R0 is provided with an engine output gear Ge serving as an output member of the differential mechanism. The sun gear S0, the carrier CA0 and the ring gear R0 correspond to "first rotary element", "second rotary element" and "third rotary element" recited in the appended claims. The first motor generator MG1 corresponds to "differential-control rotating machine" recited in the appended claims. The first motor generator MG1 is to be operated selectively as an electric motor and a generator. For example, in a regenerative control in which the first motor generator MG1 is operated as the generator, a rotational speed of the sun gear S0 is controlled in a continuously changing manner, whereby a rotational speed transmitted from the engine 20 is continuously changed and is outputted through the engine output gear Ge. Further, when a torque of the first motor generator MG1 is controlled to zero, the sun gear S0 is idled or freely rotated whereby transmission of the drive force between the engine 20 and the electrically-controlled continuously-variable transmission 26 is interrupted so that dragging of the engine 20 is prevented. The electrically-controlled continuously-variable transmission 26 corresponds to "automatic transmission" recited in the appended claims.

Figure 2:
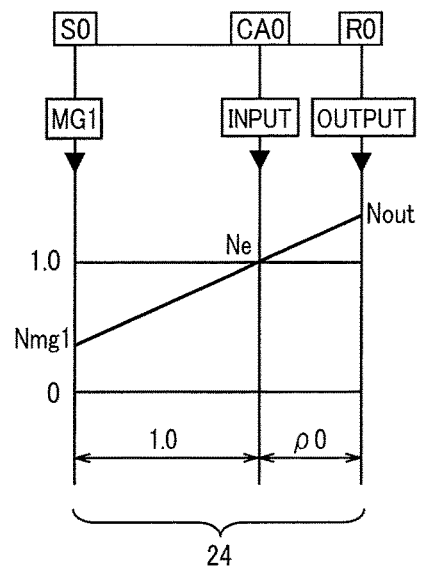
FIG. 2 is a collinear chart indicating a relationship among rotational speeds of rotary elements of an electrically-controlled continuously-variable transmission provided in the hybrid vehicle of FIG. 1.

FIG. 2 is a collinear chart indicating a relationship among rotational speeds of the respective three rotary elements S0, CA0, R0 of the planetary gear device 24, wherein the rotational speeds are represented on respective three vertical axes that are parallel to one another. In the collinear chart of FIG. 2, an interval between the vertical axes is determined such that the rotational speeds of the respective three rotary elements S0, CA0, R0, which are represented on the respective three vertical axes, are connected by a straight line. Further, in the collinear chart, "p0" represents a gear ratio (=the number of teeth of the sun gear S0/the number of teeth of the ring gear R0) of the planetary gear device 24. In the collinear chart of FIG. 2, the carrier CA0 as the second rotary element, which is connected to the engine 20, is located between the sun gear S0 as the first rotary element and the ring gear R0 as the third rotary element. The rotational speed Nmg1 of the sun gear S0 corresponds to a rotational speed (MG1 rotational speed) of the first motor generator MG1. The rotational speed Ne of the carrier CA0 corresponds a rotational speed (engine rotational speed) of the engine 20. The rotational speed Nout of the ring gear R0 corresponds to an output rotational speed. With the MG1 rotational speed Nmg1 being controlled by, for example, the regenerative control of the first motor generator MG1, the output rotational speed Nout relative to the engine rotational speed Ne (that corresponds to an input rotational speed) can be changed continuously without step. That is, a gear ratio $\gamma 0 (=Ne/Nout)$ of the electrically-controlled continuously-variable transmission 26 can be changed continuously without step. It is noted that the planetary gear device 24 can be modified such that the first motor generator MG1 is connected to the ring gear R0 and the engine output gear Ge is provided in the sun gear S0. Further, the planetary gear device 24 may be constituted by a planetary gear device of double pinion type, such that the engine 20 is connected to a ring gear, the first motor generator MG1 is connected to one of a sun gear and a carrier, and the engine output gear Ge is provided in the other of the sun gear and the carrier. In this case with the planetary gear device of double pinion type, the ring gear is located between the sun gear and the carrier in its collinear chart.

Referring back to FIG. 1, a reduction gear device 30 is provided on the second axis S2, and includes a large diameter gear Gr1 and a small diameter gear Gr2 that are disposed on respective opposite end portions of a shaft 28 whose axis correspond to the second axis S2. The large diameter gear Gr1 of the reduction gear device 30 meshes with the engine output gear Ge, and meshes with a motor output gear Gm of a second motor generator MG2 that is provided on the third axis S3. The second motor generator MG2 is to be operated selectively as an electric motor and a generator. For example, in a power running control in which the second motor generator MG2 is operated as the electric motor, the second motor generator MG2 serves as another drive force source for driving the vehicle 10. The second motor generator MG2 corresponds to a vehicle-driving rotating machine.

The small diameter gear Gr2 of the reduction gear device 30 meshes with a differential ring gear Gd of the differential device 32 that is disposed on the fourth axis S4, so that the drive force transmitted from the engine 20 and/or the second motor generator MG2 is transmitted to the differential device 32 through the small diameter gear Gr2 and the differential ring gear Gd. Then, the drive force is distributed to right and left drive axles 36 through the differential device 32 and is then transmitted to right and left drive wheels 38.

Figure 3:
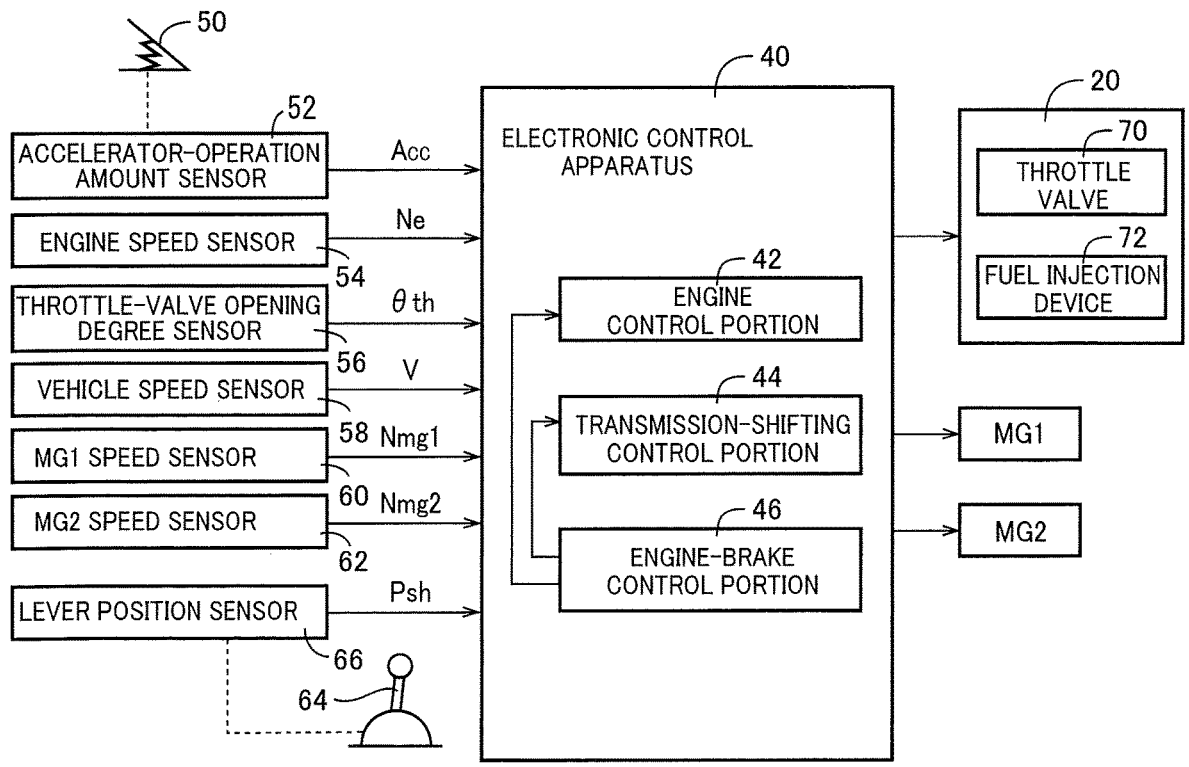
FIG. 3 is a view showing various functions of an electronic control apparatus provided in the hybrid vehicle of FIG. 1, and input and output signals that are inputted to and outputted from the electronic control apparatus.

As shown in FIG. 3, the vehicle 10 is provided with an electronic control apparatus 40 as a controller that is configure to control an output of the engine 20, a torque of the first motor generator MG1 and a torque of the second motor generator MG2, and also to control shifting of the electrically-controlled continuously-variable transmission 26 by controlling the torque of the first motor generator MG1. The electronic control apparatus 40 includes a microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 40 may be constituted by two or more control units exclusively assigned to perform different control operations such as the engine control operation, the motor control operation and the shifting control operation.

The electronic control apparatus 40 corresponds to "control apparatus (that is to be provided in a vehicle)" that is recited in the appended claims.

The electronic control apparatus 40 is configured to receive various data required to execute various control operations. Specifically, the electronic control apparatus 40 receives: an output signal of an accelerator-operation amount sensor 52 indicative of an accelerator operation amount Ace of an accelerator pedal 50 which represents an amount of accelerating operation made by an operator of the vehicle 10 (hereinafter referred to as "vehicle operator"), an output signal of an engine speed sensor 54 indicative of an engine rotational speed Ne that is a rotational speed of the engine 12; an output signal of a throttle-valve opening degree sensor 56 indicative of an opening degree θth of a throttle valve 70 of the engine 20; an output signal of a vehicle speed sensor 58 indicative of a running speed V of the vehicle 10; an output signal of a MG1 speed sensor 60 indicative of an MG1 rotational speed Nmg 1 that is a rotational speed of the first motor generator MG1; an output signal of a MG2 speed sensor 62 indicative of an MG2 rotational speed Nmg2 that is a rotational speed of the second motor generator MG2; and an output signal of a lever position sensor 66 indicative of an operation position Psh of a shift lever 64. The running speed V corresponds to the output rotational speed Nout.

The shift lever 64 is a shifting operation member that is to be operated by the vehicle operator so as to be placed in a selected one of five operation positions, which are "P", "R", "N" and "B", so that the drive-force transmitting apparatus 12 is electrically switched between a plurality of drive-force transmitting states (a plurality of ranges) in accordance with the operation of the shifting operation member made by the vehicle operator. When the shift lever 64 is placed in the position "P", a parking range is selected whereby the drive-force transmitting apparatus 12 is placed in a drive-force transmitting states in which rotations of the drive wheels 38 is mechanically locked by a parking-lock mechanism (not shown). When the shift lever 64 is placed in the position "R", a reverse running range is selected whereby the drive-force transmitting apparatus 12 is placed in a drive-force transmitting states in which the vehicle 10 is to run in a reverse direction with the second motor generator MG2 being rotated in a reverse direction by control made by the electronic control apparatus 40. When the shift lever 64 is placed in the position "N", a neutral range is selected whereby the drive-force transmitting apparatus 12 is placed in a drive-force transmitting states in which transmission of the drive force is interrupted with torques of both of the motor generators MG1, MG2 being zeroed by control made by the electronic control apparatus 40. When the shift lever 64 is placed in the position "D", a forward running range is selected whereby the drive-force transmitting apparatus 12 is placed in a drive-force transmitting state in which the vehicle 10 is to run in a forward direction by an engine torque transmitted from the engine 20 with the first motor generator MG1 being subjected to a regenerative control made by the electronic control apparatus 40, or by a torque transmitted from the second motor generator MG2 that is subjected to a power-running control made by the electronic control apparatus 40. When the shift lever 64 is placed in the position "B", a drive-force-source brake available range (corresponding to an engine-brake available range describe below) is selected whereby the drive-force transmitting apparatus 12 is placed in a drive-force transmitting state in which the drive-force-source brake is available during forward running of the vehicle 10. When the drive-force-source brake available range is being selected, the drive-force-source brake is applied to the vehicle 10, with the second motor generator MG2 being subjected to the regenerative control made by the electronic control apparatus 40, or with the first motor generator MG1 being subjected to the regenerative control made by the electronic control apparatus 40, which causes rotation of the engine 20 that is placed in a fuel-cut state.

FIG. 3 is a view showing a part of various control functions performed by the electronic control apparatus 40 that includes an engine control portion 42, a transmission-shifting control portion 44 and an engine-brake control portion 46.

The engine 20 includes the above-described throttle valve 70 that is to be electronically controlled to control an intake air amount and also a fuel injection device 72 that is provided to control a fuel injection amount. The engine control portion 42 is configured to control the throttle valve 70, the fuel injection device 72 and other components of the engine 20, such that the engine 20 generates a required engine torque determined based on a required drive force that is obtained depending on, for example, the accelerator operation amount Ace. When the accelerator operation amount Acc is zero with the accelerator pedal 55 being released (i.e., acceleration OFF), the control portion 42, basically, causes the throttle valve 70 to be fully closed, and causes the fuel injection device 72 to stop the fuel injection to establish the fuel-cut state of the engine 20.

The transmission-shifting control portion 44 is configured to continuously change the gear ratio γ0 of the electrically-controlled continuously-variable transmission 26, by increasing or reducing the MG1 rotational speed Nmg1 with the regenerative control being executed in the first motor generator MG1, such that the engine rotational speed Ne becomes a required speed value. The shifting of the electrically-controlled continuously-variable transmission 26 is controlled, for example, in accordance with a predetermined shift map, based on various parameters such as the throttle-valve opening degree θth, the vehicle running speed V, the output rotational speed Nou and other values representing a state of the vehicle 10. When an engine brake is to be generated with the accelerator pedal 55 being released (i.e., acceleration OFF), the engine-brake control portion 46 instructs or causes the transmission-shifting control portion 44 to control the shifting of the electrically-controlled continuously-variable transmission 26 such that the engine 20 (that is placed in the fuel-cut state) is rotated at a required speed value whereby the engine brake is generated by, for example, a friction loss and a pumping loss caused in the engine 20.

Figure 4:
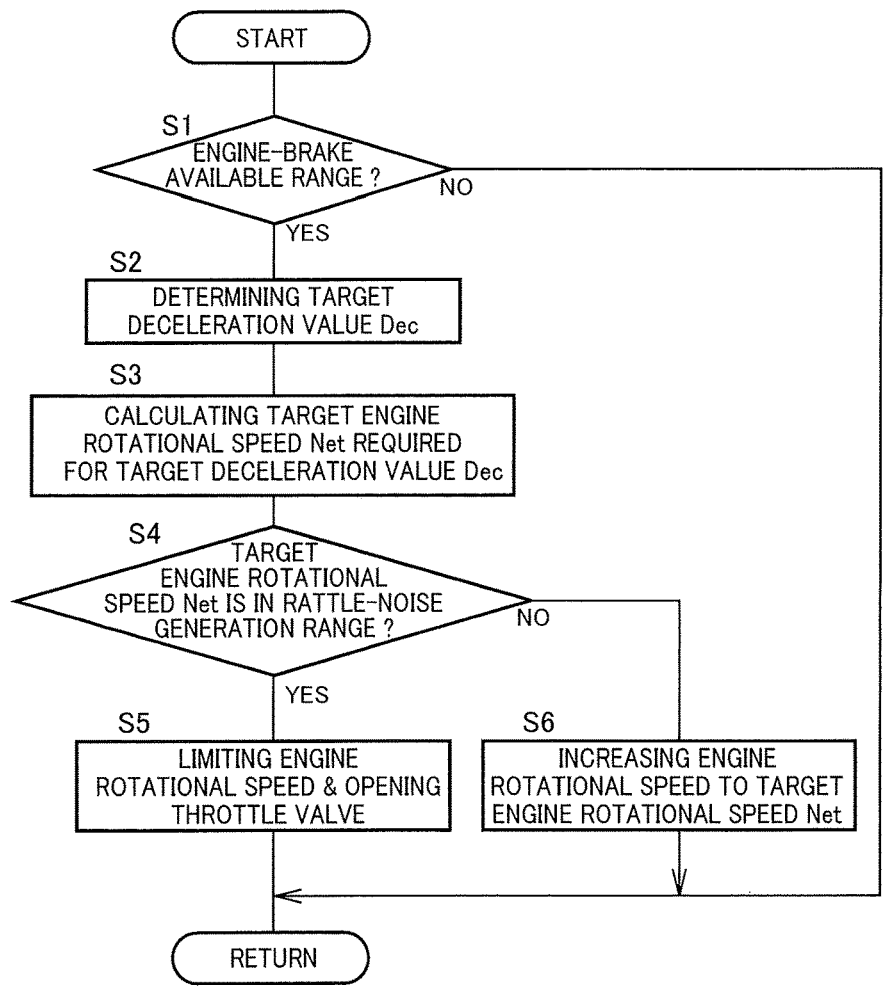
FIG. 4 is a flow chart specifically showing a control routine as signal processing operations executed by an engine-brake control portion shown in FIG. 3.

The engine-brake control portion 46 is configured, when the accelerator pedal 55 is being released (i.e., acceleration OFF), to cause the engine control portion 42 to control the engine 20, and to cause the transmission-shifting control portion 44 to control the shifting of the electrically-controlled continuously-variable transmission 26, such that a desired engine brake is generated. FIG. 4 is a flow chart showing a control routine that is to be executed by the engine-brake control portion 46. In execution of the control routine, the engine-brake control portion 46 executes signal processing operations at steps S1-S6 of the control routine.

As shown in FIG. 4, the control routine is initiated with step Si that is implemented to determine whether the drive-force transmitting apparatus 12 is in an engine-brake available range in which the vehicle 10 can be decelerated by the engine brake. When an affirmative determination is made at step S1, steps S2 and the subsequent steps are implemented to execute an engine brake control. When a negative determination is made at step S1, one cycle of execution of the control routine is completed. In the present embodiment, the engine-brake available range corresponds to a drive-force-source brake range that is selected with the shift lever 64 being placed in the position "B", so that steps S2 and the subsequent steps are implemented when the drive-force-source brake range is selected. As long as the drive-force transmitting apparatus 12 is in the drive-force transmitting state in which the engine 20 is rotated with the rotations of the drive wheels 38, namely, as long as the drive-force transmitting apparatus 12 is in the engine-brake available range, steps S2 and the subsequent steps can be implemented to execute the engine brake control, irrespective of name of the currently selected range.

Figure 5:
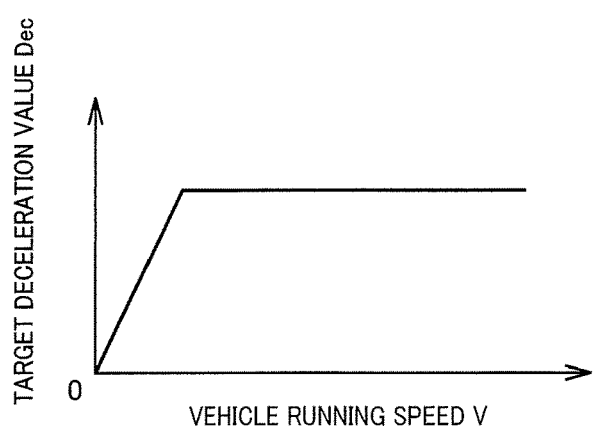
FIG. 5 is a view showing, by way of example, a map used for determining a target deceleration value of the hybrid vehicle at step S2 of the control routine shown in FIG. 4.

When an affirmative determination is made at step S1, step S2 is implemented to determine a target deceleration value Dec of the vehicle 10. The target deceleration value Dec is determined, for example, in accordance with a map shown by way of example in FIG. 5, wherein the map defines a relationship between the target deceleration value Dec and the vehicle running speed V. That is, in the present embodiment, the target deceleration value Dec is determined depending on the vehicle running speed V. However, the target deceleration value Dec may be determined depending on another running state such as a road slope. The map shown in FIG. 5 is merely an example, and may be modified as needed. Further, the target deceleration value Dec may be determined in accordance with a command requesting deceleration of the vehicle 10, wherein the command is issued through, for example, an operation of a target-deceleration-value setting switch which is made by the vehicle operator. Still further, the target deceleration value Dec may be set to a required deceleration value which is determined to reduce the vehicle running speed V, for example, during an automatic running of the vehicle 10, and which is read out from an automatic-running control portion or another control portion other than the engine-brake control portion 46.

Step S2 is followed by step S3 that is implemented to calculate a target engine rotational speed Net (i.e., target speed value of the engine rotational speed Ne) that is required to generate a required engine brake torque Tebd (i.e., required torque value of an engine brake torque Teb) that is required to establish the target deceleration value Dec of the vehicle 10 that is determined at step S2. At this step S3, the target engine rotational speed Net is calculated based on, for example, an engine brake characteristic that is a relationship between the engine rotational speed Ne and the engine brake torque Teb, which is indicated by solid line in FIG. 6. Since the engine brake torque Teb corresponds to the deceleration of the vehicle 10, the required engine brake torque Tebd can be determined depending on only the target deceleration value Dec, for example, through a predetermined map or mathematical expression. However, the required engine brake torque Tebd may be determined also by taking account of other running states such as the road slope and a vehicle weight that is dependent on, for example, the number of passengers. Further, where the vehicle 10 is to be decelerated by a regenerative torque generated by the second motor generator MG2 in addition to the engine brake torque Teb generated by the engine 20, the required engine brake torque Tebd may be calculated to be subtracted by the regenerative torque. It is noted that the target engine rotational speed Net may be calculated directly from the target deceleration value Dec through, for example, a predetermined map or mathematical expression, without obtaining or calculating the required engine brake torque Tebd.

Step S3 is followed by step S4 that is implemented to determine whether the target engine rotational speed Net calculated at step S3 is in a rattle-noise generation range that is predetermined as a problematic range. Specifically, it is determined whether the target engine rotational speed Net exceeds a rattle-noise determination value $\alpha$ (see FIG. 6) as a predetermined threshold value. In the present embodiment, the engine 20 is a reciprocating engine in which the piston 20$p$ is to be reciprocated when the engine 20 is driven. Therefore, with increase of the engine rotational speed Ne, a reciprocating inertia torque of the piston 20$p$ is increased whereby fluctuation of the engine rotational speed Ne is increased. The increase of the fluctuation of the engine rotational speed Ne could result in generation of rattle noises due to, for example, backlash of gears and plays of thrust bearings in the drive-force transmitting apparatus 12. The rattle-noise determination value $\alpha$ is set to a predetermined speed value as the predetermined threshold value, for example, through an experimentation. Specifically described, the rattle-noise determination value $\alpha$ is set to the predetermined speed value, depending on the rattle noises that are generated in various components of the drive-force transmitting apparatus 12, due to the fluctuation of the engine rotational speed Ne of the engine 20, such that the generation of the rattle noises is restrained with the engine rotational speed Ne being held not higher than the rattle-noise determination value $\alpha$. When it is determined that the target engine rotational speed Net is higher than the rattle-noise determination value $\alpha$ (Net>$\alpha$) at step S4, step S4 is followed by step S5. When it is determined that the target engine rotational speed Net is not higher than the rattle-noise determination value $\alpha$ (Net$\leq\alpha$) at step S4, step S4 is followed by step S6.

Figure 6:
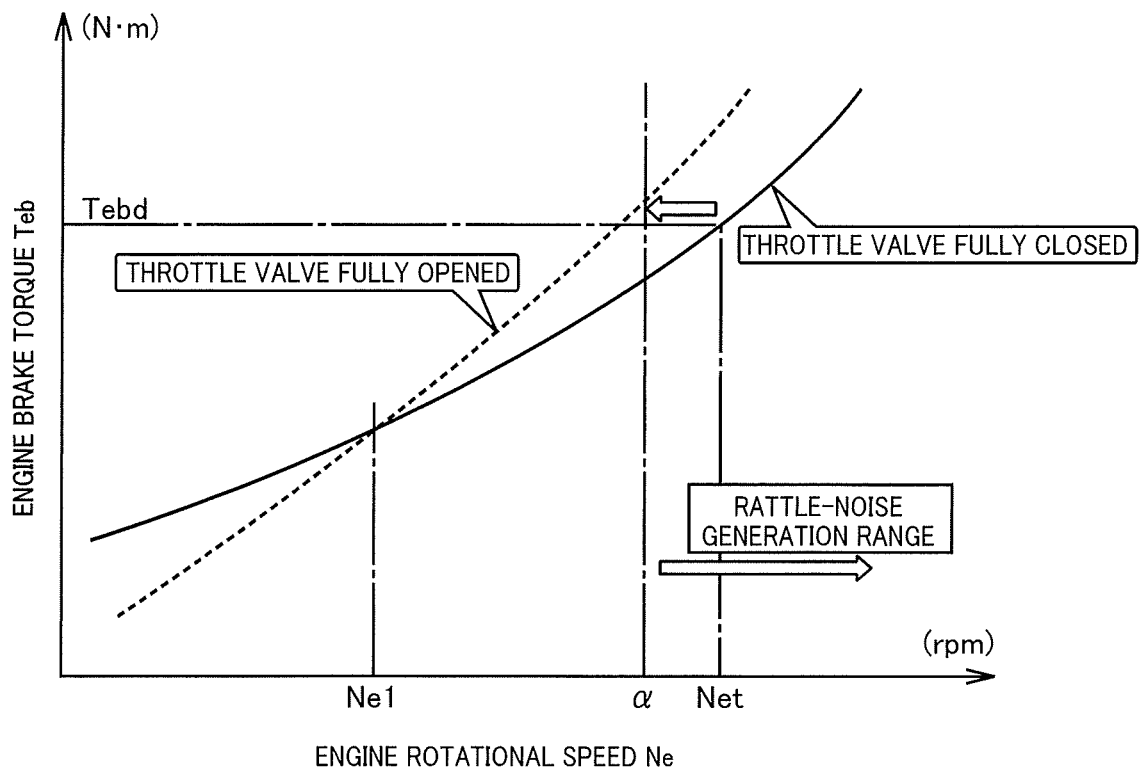
FIG. 6 is a view showing a relationship between a rotational speed and a brake torque of an engine provided in the hybrid vehicle of FIG. 1, in a comparative manner comparing a case in which a throttle valve is fully closed and a case in which the throttle valve is fully opened.

Step S5 is implemented to cause the transmission-shifting control portion 44 to execute a shifting action (shift-up action) in the electrically-controlled continuously-variable transmission 26 while limiting the shifting of the electrically-controlled continuously-variable transmission 26 such that the engine rotational speed Ne is held not higher than the rattle-noise determination value $\alpha$. Further, at this step S5, the engine control portion 42 is caused to execute an opening control of the throttle valve 70 of the engine 20, for increasing the engine brake torque Teb. As shown in FIG. 6, the engine 20 has an engine brake characteristic that the that the engine brake torque Teb is higher when the throttle valve 70 is controlled to be opened than when the throttle valve 70 is fully closed, as long as the engine rotational speed Ne is not lower than a certain speed value Ne1. That is, in a high rotational speed range in which the engine rotational speed Ne is not lower than the certain speed value Ne1, when the throttle valve 70 is controlled to be opened to allow an outside gas or air to be intaken into a combustion chamber of each cylinder of the engine 20, a resistance (i.e., pressure within the combustion chamber) is increased during a compression stroke of the cylinder, thereby increasing a pumping loss, so that the engine brake torque Teb is increased more than when the throttle valve 70 is fully closed. It is noted that the rattle-noise determination value $\alpha$ is set to a speed value that is higher than the certain speed value Ne1.

Thus, the generation of the rattle noises is restrained with the engine rotational speed Ne being held not higher than the rattle-noise determination value $\alpha$, and the engine brake torque Teb generated by the engine 20 is increased with the throttle valve 70 being controlled to be opened, whereby the target deceleration value of the vehicle 10 can be obtained. Although the engine rotational speed Ne after execution of the shift-up action of the electrically-controlled continuously-variable transmission 26 is preferably substantially equal to the rattle-noise determination value α, it may be a speed value lower than the rattle-noise determination value α. Further, when the engine brake torque Teb exceeds the required engine brake torque Tebd with the throttle valve 70 being fully opened (namely, with the throttle-valve opening degree θth being 100%), the throttle-valve opening degree θth is controlled to a degree that provides the required engine brake torque Tebd, so that the vehicle 10 is decelerated at the target deceleration value Dec by the required engine brake torque Tebd. When the engine brake torque Teb does not reach the required engine brake torque Tebd even with the throttle valve 70 being fully opened, the engine brake torque Teb is increased toward the required engine brake torque Tebd so as to become close to the required engine brake torque Tebd as much as possible, by fully opening the throttle valve 70. FIG. 6 shows, by way of example, a case in which the shifting of the electrically-controlled continuously-variable transmission 26 is controlled such that the engine rotational speed Ne becomes substantially equal to the rattle-noise determination value α after the shift-up action of the electrically-controlled continuously-variable transmission 26, and the throttle-valve opening degree θth is controlled to a certain value that is smaller than 100% (full-open value) such that the required engine brake torque Tebd is generated by the engine 20.

On the other hand, at step S6 that is implemented when the target engine rotational speed Net is not higher than the rattle-noise determination value (Net≤α), the transmission-shifting control portion 44 is caused to execute a shift-down action in the electrically-controlled continuously-variable transmission 26 such that the engine rotational speed N becomes substantially equal to the target engine rotational speed Net, while causing the engine control portion 42 to keep the throttle valve 70 of the engine 20 fully closed. Thus, the required engine brake torque Tebd is generated by the engine 20, with the engine rotational speed Ne being increased to the target engine rotational speed Net, so that the vehicle 10 is decelerated at the target deceleration value Dec.

As described above, in the vehicle 10 in the present embodiment, when the target engine rotational speed Net exceeds the rattle-noise determination value α, namely, when an affirmative determination is made at step S4, the shifting of the electrically-controlled continuously-variable transmission 26 is limited such that the engine rotational speed Ne is held not higher than the rattle-noise determination value α, and the throttle valve 70 of the engine 20 is controlled to be opened. Owing to this control arrangement, it is possible to restrain generation of the rattle noises that could be caused with the engine rotational speed Ne exceeding the rattle-noise determination value α, and to provide the vehicle 10 with a satisfactory deceleration performance owing to increase of the engine brake torque Teb that is made with the throttle valve 70 controlled to be opened.

Further, the target engine rotational speed Net is calculated based on the target deceleration value Dec of the vehicle 10, so that it is possible to cause the vehicle 10 to be decelerated at an appropriate rate dependent on the target deceleration value Dec, while restraining generation of the rattle noises.

In the vehicle 10 in the present embodiment, the automatic transmission is constituted by the electrically-controlled continuously-variable transmission 26. Thus, since a torque converter or other fluid-operated drive-force transmitting device is not required, the fluctuation of the engine rotational speed Ne is transmitted directly or through a damper device to the drive-force transmitting apparatus 12 including the electrically-controlled continuously-variable transmission 26, so that the rattle noises could be easily generated in the drive-force transmitting apparatus 12. Therefore, in the vehicle 10 in the present embodiment, a technical advantages of the invention is particularly significant, wherein the technical advantage is that a satisfactory deceleration performance is assured with a sufficient increase of the engine brake torque Teb while generation of the rattle noises is restrained, by the control arrangement in which the throttle valve 70 is controlled to be opened while the engine rotational speed Ne is controlled to be held not higher than the rattle-noise determination value α.

In the present embodiment, the rattle-noise determination value α is determined based on the rattle noises generated in the drive-force transmitting apparatus 12 due to the fluctuation of the engine rotational speed Ne, such that generation of the rattle noises is restrained with the engine rotational speed Ne being held not higher than the rattle-noise determination value α. Owing to this control arrangement, it is possible to appropriately restrain the generation of the rattle noises that could be caused due to the fluctuation of the engine rotational speed Ne.

In the present embodiment, the engine 20 has an engine brake characteristic that the engine brake torque Teb is made higher when the throttle valve 70 is controlled to be opened than when the throttle valve 70 is fully closed as long as the engine rotational speed Ne is not lower than the certain speed value Ne1, wherein the rattle-noise determination value α of the engine rotational speed Ne is higher than the certain speed value Ne1 of the engine rotational speed Ne. It is therefore possible to reliably increase the engine brake torque Teb with the throttle valve 70 being controlled to be opened, while restraining the generation of the rattle noises with the engine rotational speed Ne being held not higher than the rattle-noise determination value α.

While the preferred embodiment of this invention has been described in detail by reference to the drawings, it is to be understood that the embodiment described above is given for illustrative purpose only, and that the present invention may be embodied with various modifications and improvements which may occur to those skilled in the art.

NOMENCLATURE OF ELEMENTS

10: hybrid vehicle (vehicle)
12: drive-force transmitting apparatus (drive-force transmitting path)
20: engine
24: planetary gear device (differential mechanism)
26: electrically-controlled continuously-variable transmission (automatic transmission)
38: drive wheel
40: electronic control apparatus (control apparatus)
46: engine-brake control portion
70: throttle valve
MG1: first motor generator (differential-control rotating machine)
S0: sung gear (first rotary element)
CA0: carrier (second rotary element)
R0: ring gear (third rotary element)
Ge: engine output gear (output member)
Dec: target deceleration value
Teb: engine brake torque
Ne: engine rotational speed
Net: target engine rotational speed
Ne1: certain speed value α: rattle-noise determination value (predetermined threshold value)

What is claimed is:

1. A control apparatus that is to be provided in a vehicle, the vehicle including (i) an engine that is used as a drive force source for driving the vehicle, and (ii) an automatic transmission that constitutes a part of a drive-force transmitting path between the engine and drive wheels of the vehicle,
wherein the control apparatus comprises an engine-brake control portion configured to calculate a target speed value of a rotational speed of the engine that is required to provide a required torque value of an engine brake torque,
wherein the engine-brake control portion is configured to control shifting of the automatic transmission such that the rotational speed of the engine is approximated to the target speed value of the rotational speed of the engine,
wherein the engine-brake control portion is configured to determine whether the target speed value of the rotational speed of the engine exceeds a predetermined threshold value, and
wherein, when the target speed value exceeds the predetermined threshold value, the engine-brake control portion is configured to control the shifting of the automatic transmission such that the rotational speed of the engine is held not higher than the predetermined threshold value, and is configured to control a throttle valve of the engine such that the throttle valve is opened.

2. The control apparatus according to claim 1,
wherein the target speed value of the rotational speed of the engine is calculated based on a target deceleration value of the vehicle.

3. The control apparatus according to claim 1,
wherein the automatic transmission is an electrically-controlled continuously-variable transmission that includes a differential-control rotating machine and a differential mechanism,
wherein the differential mechanism includes a first rotary element connected to the differential-control rotating machine, a second rotary element connected to the engine, and a third rotary element connected to an output member, and
wherein the electrically-controlled continuously-variable transmission is configured to continuously change the rotational speed of the engine with a rotational speed of the differential-control rotating machine being controlled.

4. The control apparatus according to claim 1,
wherein the predetermined threshold value is determined based on rattle noises generated in the drive-force transmitting path due to fluctuation of the rotational speed of the engine, such that generation of the rattle noises is restrained with the rotational speed of the engine being held not higher than the predetermined threshold value.

5. The control apparatus according to claim 1,
wherein the engine has an engine brake characteristic that the engine brake torque is higher when the throttle valve is controlled to be opened than when the throttle valve is fully closed as long as the rotational speed of the engine is not lower than a certain speed value, and
wherein the predetermined threshold value of the rotational speed of the engine is higher than the certain speed value of the rotational speed of the engine.

6. The control apparatus according to claim 1,
wherein, when the target speed value does not exceed the predetermined threshold value, the engine-brake control portion is configured to control the shifting of the automatic transmission such that the rotational speed of the engine becomes substantially equal to the target speed value, and is configured to keep the throttle valve closed.

7. The control apparatus according to claim 1, further comprising a transmission-shifting control portion configured to control the shifting of the automatic transmission,
wherein, when the target speed value exceeds the predetermined threshold value, the engine-brake control portion is configured to cause the transmission-shifting control portion to control the shifting of the automatic transmission such that the rotational speed of the engine is held not higher than the predetermined threshold value.

8. The control apparatus according to claim 1, further comprising an engine control portion configured to control the throttle valve of the engine,
wherein, when the target speed value exceeds the predetermined threshold value, the engine-brake control portion is configured to cause the engine control portion to control the throttle valve of the engine such that the throttle valve is opened.

* * * * *